US010055510B2

(12) United States Patent
Atasu et al.

(10) Patent No.: US 10,055,510 B2
(45) Date of Patent: Aug. 21, 2018

(54) METHOD FOR DETECTING CLIQUES IN GRAPHS (71) Applicant: International Business Machines Corporation, Armonk, NY (US)

(72) Inventors: Kubilay Atasu, Rueschlikon (CH); Silvio Dragone, Olten (CH)

(73) Assignee: International Business Machines Corporation, Armonk, NY (US)

( * ) Notice: Subject to any disclaimer, the term of this patent is extended or adjusted under 35 U.S.C. 154(b) by 342 days.

(21) Appl. No.: 14/932,076

(22) Filed: Nov. 4, 2015

(65) Prior Publication Data
US 2017/0124218 A1 May 4, 2017

(51) Int. Cl.
*G06F 17/30* (2006.01)
*G06T 1/20* (2006.01)

(52) U.S. Cl.
CPC .. *G06F 17/30958* (2013.01); *G06F 17/30445* (2013.01); *G06T 1/20* (2013.01)

(58) Field of Classification Search
CPC G06F 17/30958; G06F 17/30445; G06T 1/20
See application file for complete search history.

(56) References Cited

U.S. PATENT DOCUMENTS

2017/0288990 A1* 10/2017 Atasu ................ G06F 17/2247

OTHER PUBLICATIONS

Rossi, Ryan A., David F. Gleich, Assefaw H. Gebremedhin, Md Patwary, and Mostofa Ali. "Parallel maximum clique algorithms with applications to network analysis and storage." arXiv preprint arXiv:1302.6256 (2013).*
McCreesh, Ciaran, and Patrick Prosser. "Multi-threading a state-of-the-art maximum clique algorithm." Algorithms 6, No. 4 (2013): 618-635.*
Cruz, Roberto, Nancy López, and Christian Trefftz. "Parallelizing a heuristic for the maximum clique problem on gpus and clusters of workstations." In Electro/Information Technology (EIT), 2013 IEEE International Conference on, pp. 1-6. IEEE, 2013.*

(Continued)

*Primary Examiner* — Taelor Kim
*Assistant Examiner* — Jesse P Frumkin
(74) *Attorney, Agent, or Firm* — Daniel P. Morris, Esq.; Otterstedt, Ellenbogen & Kammer, LLP (57) ABSTRACT

A method is provided for searching a graph to identify cliques using a set of processing elements (PEs), a first PE of the set of PEs having access to an adjacency list of a seed vertex of the graph, the adjacency list of the seed vertex including a set of vertices. The method includes: generating a data structure for each intermediate vertex of the set of vertices, the data structure indicating the respective intermediate vertex and an additional list of intermediate vertices of the set of vertices; storing the generated data structures; for each buffered data structure, receiving the buffered data structure and configuring the available PE to receive an adjacency list of the intermediate vertex indicated in the respective data structure and to select from the adjacency list a set of further vertices that are adjacent to the seed vertex and are part of the additional list.

18 Claims, 4 Drawing Sheets (56) References Cited

OTHER PUBLICATIONS

Rossi, Ryan A., David F. Gleich, Assefaw H. Gebremedhin, and Md Mostofa Ali Patwary. "Fast maximum clique algorithms for large graphs." In Proceedings of the 23rd International Conference on World Wide Web, pp. 365-366. ACM, 2014.*

Rossi, Ryan A., David F. Gleich, and Assefaw H. Gebremedhin. "Parallel maximum clique algorithms with applications to network analysis." SIAM Journal on Scientific Computing 37, No. 5 (2015): C589-C616.*

Gerhards, Leonhard, and Wolfgang Lindenberg. "Clique detection for nondirected graphs: Two new algorithms." Computing 21, No. 4 (1979): 295-322.*

Schmidt, Matthew C., Nagiza F. Samatova, Kevin Thomas, and Byung-Hoon Park. "A scalable, parallel algorithm for maximal clique enumeration." Journal of Parallel and Distributed Computing 69, No. 4 (2009): 417-428.*

Prosser, Patrick. "Exact algorithms for maximum clique: A computational study." Algorithms 5, No. 4 (2012): 545-587.*

* cited by examiner

METHOD FOR DETECTING CLIQUES IN GRAPHS

BACKGROUND

The present invention relates to the field of digital computer systems, and more specifically, to a method for searching a graph to identify cliques.

The traditional way of scaling up the performance of "Big Data" analytics applications is to deploy them on a MapReduce cluster. MapReduce was designed with scalability, fault tolerance and ease of programming in mind, and achieves a near linear scaling in performance for tasks that require a brute force scan of the input. However, its raw performance for service analytics applications is a matter of debate. Approaches that use application specific data access schemes often outperform the brute force scan strategy of MapReduce.

Large data sets can be viewed as very large graphs since the data entries relate to a subset of other data entries, like the webpages do link to related webpages. For analysis of such "Big Data" one is often interested in finding highly linked subsets or hot-spot. For example, random graphs processed within a standard processor environment require random access to the main memory. This limits in the end attempts to optimize algorithms such as the Bron-Kerbosch algorithm within a standard processor environment. The irregular memory accesses and the limited single instruction multiple data (SIMD) parallelism exhibited by these algorithms, combined with a need for dynamic parallelization and load balancing, create a significant mismatch with the computation, memory access, and communication capabilities of the graphics processor unit (GPU) architecture.

SUMMARY

Various embodiments provide a method for searching a graph to identify cliques, a set of processing elements (PEs) and a hardware accelerator as described by the subject matter of the independent claims. Advantageous embodiments are described in the dependent claims. Embodiments of the present invention can be freely combined with each other if they are not mutually exclusive.

In accordance with one embodiment, the invention relates to a method for searching a graph to identify cliques using a set of processing elements, or PEs, wherein a first PE of the set of PEs has access to a set of vertices adjacent to a seed vertex of the graph, the method comprising:
- a) generating, by the first PE, a data structure for each vertex Vx of the set of vertices, referred to hereinafter as an intermediate vertex, the data structure indicating the respective intermediate vertex Vx and an additional list of zero or more intermediate vertices of the set of vertices;
- b) storing, by the first PE, the generated data structures in a data buffer;
- c) for each buffered data structure of the buffered data structures:
    - receiving, by an available PE of the set of PEs, the buffered data structure from the data buffer;
    - configuring the available PE to receive an adjacency list of the intermediate vertex Vx indicated in the respective data structure and to select from the adjacency list of the intermediate vertex a set of further vertices that are adjacent to the seed vertex and are part of the additional list;

when at least one further vertex is selected, repeating steps a) through c) with the available PE being the first PE and the set of further vertices being the set of vertices, and when at least one further vertex is not selected, generating a clique candidate using the seed vertex and the intermediate vertices that have been processed in step c) (e.g., for which the available PE has received and processed an adjacency list);
- d) selecting among the clique candidates having overlapping pairs of vertices cliques comprising a maximum number of vertices and selecting other cliques as clique candidates having non-overlapping pairs of vertices with other clique candidates.

In accordance with another embodiment, the invention relates to a set of PEs for searching a graph to identify cliques, the set of PEs comprising a first PE having access to a set of vertices adjacent to a seed vertex of the graph, the first PE being configured for:
- a) generating by the first PE a data structure for each vertex of the set of vertices, referred to hereinafter as an intermediate vertex, the data structure indicating the respective intermediate vertex and an additional list of zero or more intermediate vertices of the set of vertices;
- b) storing by the first PE the generated data structures in a data buffer;
- c) for each buffered data structure of the buffered data structures, the set of PEs comprising an available PE configured for:
    - receiving, by an available PE of the set of PEs, the buffered data structure from the data buffer; and
    - configuring the available PE to receive an adjacency list of the intermediate vertex indicated in the respective data structure and to select from the adjacency list of the intermediate vertex a set of further vertices that are adjacent to the seed vertex and are part of the additional list; wherein when at least one further vertex is selected, repeating steps a) through c) with the available PE being the first PE and the set of further vertices being the set of vertices.

In accordance with yet another embodiment, the invention relates to a hardware accelerator comprising a set of PEs according to previous embodiments. The hardware accelerator is configured for selecting among clique candidates having overlapping pairs of vertices cliques comprising a maximum number of vertices and for selecting other cliques as clique candidates having non-overlapping pairs of vertices with other clique candidates.

BRIEF DESCRIPTION OF THE SEVERAL VIEWS OF THE DRAWINGS

In the following embodiments of the invention are explained in greater detail, by way of example only, making reference to the drawings in which.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present method as described below may provide an internal data flow that can be handled in two modes: synchronous and asynchronous. In the synchronous mode processing elements (PEs) are "clocked" by the input of the data buffer e.g. a ring-buffer and the PEs only proceed when the fitting input is available for them. This design may be suitable for platforms like GPUs, FPGAs, and ASICs.

An optimization in the adjacency list makes it possible for the PEs to run asynchronous to each other. The adjacency list will in the runtime compressed or reduce to the individual needs of remaining vertices sets Pi and would be stored in parallel to the generated data structures. This design may offer faster execution time and is suitable for platforms like FPGAs and ASICs.

A "processing element" (PE) as used herein refers broadly to a hardware component that processes input data and/or produces output data, e.g. a processor, ASIC or FPGA.

As used herein, the term "clique" will be defined as a set of vertices that form a subgraph within a graph such that a connecting edge exists between every two vertices within the clique. Stated another way, in mathematical graph theory, a clique is a subset of vertices of an undirected graph, such that its induced subgraph is complete; that is, every two distinct vertices in the clique are adjacent. Cliques are one of the basic concepts of graph theory and are used in many other mathematical problems and constructions on graphs, as will be known by those skilled in the art.

The term "graph" as used herein refers to a data structure that consists of a finite set of vertices, nodes or points, together with a set of unordered pairs of these vertices for an undirected graph or a set of ordered pairs for a directed graph. These pairs are known as edges, arcs or lines for an undirected graph, and as arrows, directed edges, directed arcs or directed lines for a directed graph. For example, a graph G is an ordered set (V,E), where V(G) represents a set of elements called vertices and E(G) represents the edges between these vertices.

The term "adjacency list" as used herein refers to a list of all or part of vertices that are adjacent to a given vertex. For example, "the adjacency list of vertex A" refers to the list of vertices that are adjacent to the vertex A. Two vertices are adjacent if they are directly linked or connected to each other by an edge.

A first PE of the set of PEs having access to the adjacency list of the seed vertex means that the first PE may receive the adjacency list e.g. as with the available PE, or means that the first PE may read the adjacency list of the seed vertex from a storage device.

The seed vertex may be user defined. In another example, the seed vertex may be randomly chosen out of the vertices of the graph.

In a further example, the seed vertex may be a first vertex of the graph to be processed before processing other vertices of the graph as described with the seed vertex. This may, for example, be used for test purposes; e.g., to check that the processing time of the seed vertex is as expected before processing the full graph.

The above features may have the advantage of saving processing resources in that the tasks are shared between the processing elements in an efficient manner so as each processing element can process only required data. This is in contrast to conventional methods where a processing element would read the required adjacency list for every vertex at the individual steps of finding cliques.

Another advantage may be that the present method may speed up the processing of graphs in order to find cliques.

Another advantage may be that the present method may avoid random access to the main memory as it is the case with conventional method, which random access limits attempts to optimize the graph searches. Memory elements may not be accessed by the PE in a random mode as accesses are predicted and therefore high bandwidth can be guaranteed.

According to one embodiment, the reception of the adjacency list of the intermediate vertex indicated in the respective data structure comprises: providing a ring buffer; receiving from the ring buffer a stream of adjacency lists of vertices of the graph and identifying the adjacency list of the intermediate vertex using the data structure.

The term "ring buffer" as used herein refers to a data structure that uses a single, fixed-size buffer as if it were connected end-to-end. This structure lends itself easily to buffering data streams. The term "ring buffer," as used herein, can mean a type of memory or storage system. A ring buffer can allow for sections of the ring buffer to be reused to store data. For example, a first set of data may be stored in a first section of the ring buffer. After that data is removed from the first set of data during the copying of data from a main memory to the ring buffer, second data can be stored in the first section of the ring buffer. Thus, the ring buffer is "circular," in that the sections of the ring buffer can be reused during a session of copying data to the ring buffer.

This embodiment may enable operation of the PEs in a synchronous mode. For example, as described in the following embodiment, the PEs may be "clocked" by the input of the ring-buffer and the PEs only proceed when the fitting input (i.e., the right adjacency list of the vertex assigned to a given PE) is available for them. This design is suitable for platforms like GPUs, FPGAs, and ASICs.

According to one or more embodiments, the method further comprises: storing, by the first PE, the set of vertices in association with the generated data structures; wherein the available PE is further configured to receive the set of vertices from the data buffer, and wherein the adjacency list of the intermediate vertex indicated in the respective data structure comprises at least part of the set of vertices.

This embodiment may have the advantage of further speeding up the process of finding cliques. This embodiment may further have the advantage of saving processing resources, such as, but not limited to, storage resources, since the data structures to be stored in each algorithm would have smaller sizes compared to the data structures described above that contain elements of every vertex of the (initial) graph.

According to one embodiment, the available PE is configured to receive the set of vertices together with the buffered data structure from the data buffer.

This embodiment may further save processing time compared to a case where the data structure and the adjacency lists are not received simultaneously.

According to one embodiment, the data buffer comprises a FIFO buffer, wherein data structures are stored and received from the FIFO buffer according to a FIFO mode of operation.

This embodiment may have the advantage in that read and write operations can occur independently without conflict. This may provide reliable and accurate results of searching the graph.

According to one embodiment, step c) is sequentially performed for each buffered data structure.

According to one embodiment, the available PE is an idle PE.

According to one embodiment, steps a) through c) are performed in accordance with a Bron-Kerbosch algorithm. This embodiment may speed up the process of the Bron-Kerbosch algorithm.

According to one embodiment, the method further comprises repeating steps a) through c) for each vertex of the graph with each vertex being the seed vertex, wherein the seed vertex has access to the adjacency list by receiving the adjacency list from a ring buffer in a stream of adjacency lists. This embodiment may have the advantage of processing the whole graph using the present method. This may have the advantage on the whole graph as described above.

According to one embodiment, the generation by the first PE of the data structure for a given intermediate vertex of the set of vertices comprises: generating the data structure having a number of elements associated with each intermediate vertex of the set of vertices, and tagging the element associated with the given intermediate vertex differently from the other elements, wherein the available PE is further configured to use the tag to identify the given intermediate vertex.

According to one embodiment, tagging comprises: assigning the first element of the data structure to the given intermediate vertex. By tagging the element that corresponds to the vertex assigned to the first PE, the first PE may easily compare that vertex with the received adjacency lists. This may further speed up the processing of the graph compared to the case where no tagging is used.

According to one embodiment, the graph comprises an undirected graph.

According to one embodiment, the graph comprises at least one of: an undirected graph with web pages as vertices and links as edges and a graph representing a social network connecting multiple users, wherein users are represented by nodes and user dependencies are represented by edges.

Figure 1:
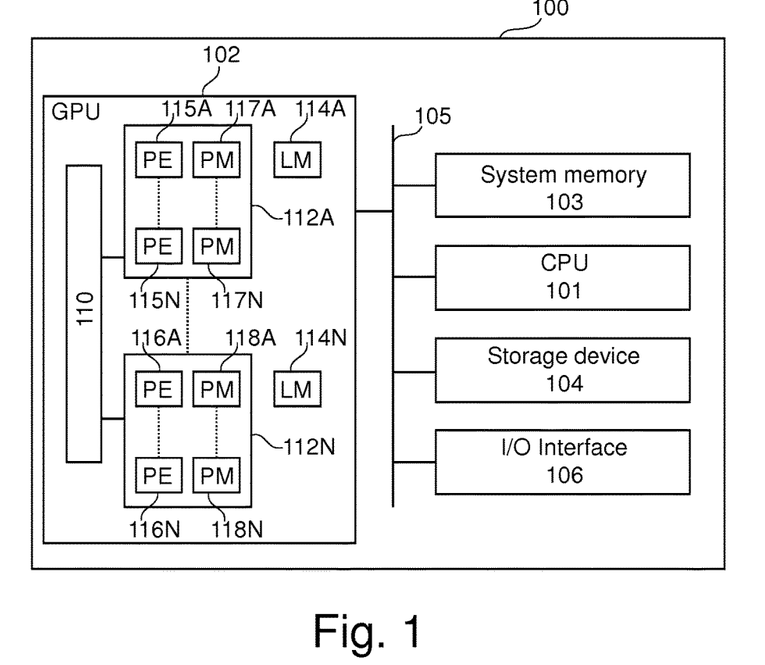
FIG. 1 depicts a block diagram of at least a portion of an exemplary computing system in which aspects of embodiments of the invention may be employed.

FIG. 1 conceptually depicts a block diagram of a computing system 100 in which aspects of embodiments of the invention may be employed. The computing system 100 may be a heterogeneous computing system. Computing system 100 may include one or more central processing units (CPUs), such as CPU 101, and one or more hardware accelerators, such as graphics processing unit (GPU) 102. The hardware accelerator such as GPU 102 (or FPGAs and ASICs.) may be used for hardware acceleration in order to perform some functions faster than is possible in software running e.g. on CPU 101. Computing system 100 may also include at least one system memory 103, at least one persistent storage device (or storage device) 104, at least one system bus 105, and at least one input/output device or interface 106.

Computing system 100 may comprise a supercomputer, a desktop computer, a laptop computer, a video-game console, an embedded device, a handheld device (e.g., a mobile telephone, smart phone, MP3 player, a camera, a global positioning system (GPS) device, or the like), or some other device that includes or is configured to include a GPU.

CPU 101 and GPU 102 may be included on separate integrated circuits (ICs) or packages. In other examples, CPU 101 and GPU 102 may be included in a single IC or package. In one example, GPU 102 may have a parallel architecture that supports executing data-parallel applications. GPU 102 may assist CPU 101 by performing certain special functions (such as, graphics-processing tasks and data-parallel, general-compute tasks).

CPU 101 may include a commercially available control processor or a custom control processor. CPU 101, for example, executes the control logic that controls the operation of computing system 100. CPU 101 may be a multi-core CPU, such as a multi-core CPU with two or more CPU cores.

GPU 102 may include a commercially available graphics processor or custom designed graphics processor. GPU 102, for example, may execute specialized code for selected functions. In general, GPU 102 may be used to execute graphics functions such as graphics pipeline computations such as geometric computations and rendering of image on a display and processing of graphs as described herein. GPU 102 may include a GPU global cache memory 110 and one or more compute units 112A-N.

Each compute unit 112A-N may be associated with a GPU local memory 114A-N, respectively. Each compute unit 112A-N may include one or more PEs (e.g., parallel PEs). For example, compute unit 112A includes GPU processing elements 115A-N, and compute unit 112N includes GPU processing elements 116A-N. Each GPU processing element 115A-116N, is associated with at least one private memory (PM) 117A-118N, respectively. Each GPU processing element may include one or more of a scalar and vector floating-point units. The GPU processing elements may also include special purpose units such as inverse-square root units and sine/cosine units. GPU global cache memory 110 may be coupled to a system memory such as system memory 103.

System memory 103 may include at least one non-persistent memory such as dynamic random access memory (DRAM). System memory 103 may hold processing logic instructions, constant values and variable values during execution of portions of applications or other processing logic.

Persistent storage device 104 includes one or more storage devices capable of storing digital data such as magnetic disk, optical disk, or flash memory. For example, at the startup of computing system 100, the operating system and other application software can be loaded in to system memory 103 from persistent storage device 104.

System bus 105 may include a Peripheral Component Interconnect (PCI) bus, Advanced Microcontroller Bus Architecture (AMBA) bus, an accelerated graphics port (AGP) bus, Industry Standard Architecture (ISA) bus, or other such device. System bus 105 may also include a network such as a local area network (LAN). System bus 105 includes the functionality to couple components including components of computing system 100. GPU 102 may communicate with CPU 101 and system memory 103 over bus 105.

Input/output interface 106 includes one or more interfaces connecting user input/output devices such as keyboard, mouse, display and/or touch screen. For example, user input may be provided through a keyboard and mouse connected user interface 106 to computing system 100. The output of computing system 100 may be output to a display through user input/output (I/O) interface 106.

Figure 2:
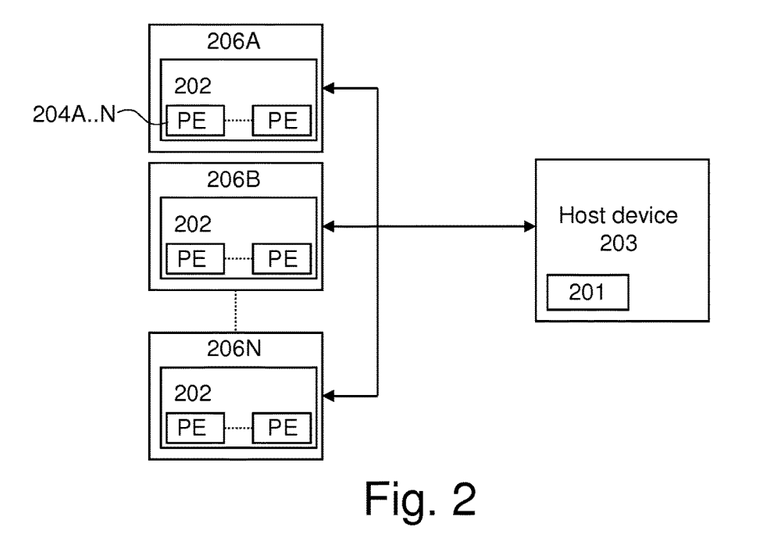
FIG. 2 depicts a block diagram illustrating one example of a distributed computing environment.

FIG. 2 depicts a block diagram illustrating one example of a distributed computing environment. Host application 201 may execute on host device 203, which may include one or more CPUs and/or other types of processors.

Host device 203 may be coupled to each of one or more compute devices 206A-N via various types of connections, including direct connections, bus connections, local area network (LAN) connections, internet connections, and the like. In addition, one or more of compute devices 206A-N may be part of a cloud computing environment.

Compute devices 206A-N are representative of any number of computing systems and processing devices which may be coupled to host device 203. Each compute device 206A-N may comprise computing system 100 as described above in conjunction with FIG. 1. Each compute device 206A-N may include a plurality of compute units 202, such as compute units 112A-N as previously described with reference to FIG. 1. Each compute unit 202 may include a plurality of processing elements 204A-N.

Host application 201 may monitor and control other programs running on compute devices 206A-N. Host application 201 may, for example, trigger the execution of at least part of the present method on compute devices 206A-N.

For example, one or more compute devices 206A-N may receive from host device 203 a graph in the form of an adjacency list for every vertex in the graph. This list may for example be stream into the parallel processing elements PEs of the one or more compute devices 206A-N.

Figure 3:
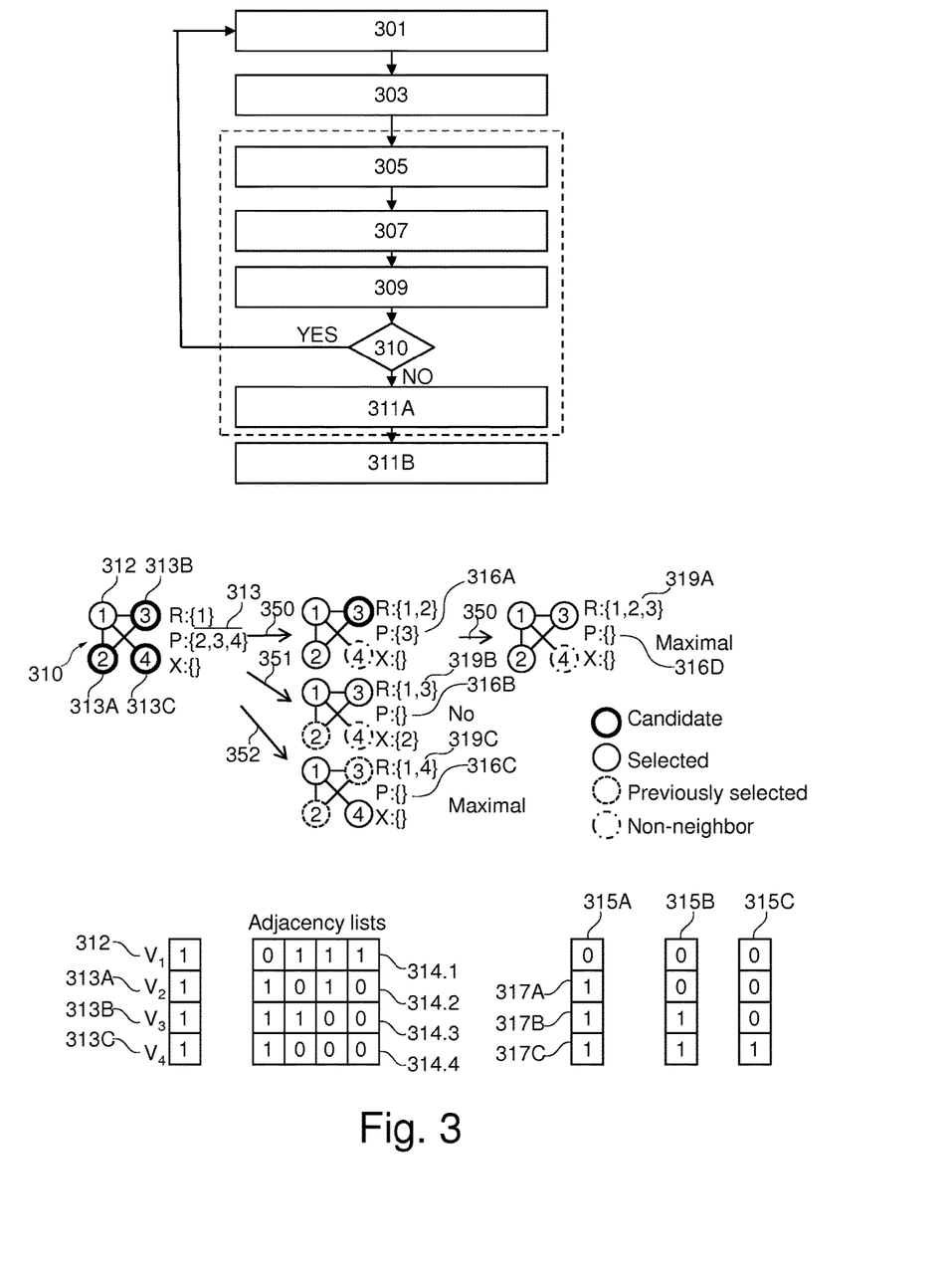
FIG. 3 is a flowchart conceptually depicting a method for searching a graph to identify cliques, according to an embodiment of the invention.

FIG. 3 is a flowchart depicting at least a portion of an exemplary method for searching a graph 310 to identify cliques, according to an embodiment of the invention. The searching of the graphs may be performed using a set of PEs; e.g., 115A-116N. The set of PEs may, for example, be part of one or more compute units 112A-N of one or more compute devices 206A-N, 100.

For example, a compute device 206A-N, 100 may receive a request from the host device 203 to search the graph 310. The request may be a request for the identification of cliques that originate from or involve one or more vertices of the graph 310. For example, the request may indicate the vertex 312 as being the seed vertex 312 from which the present method may start in order to identify cliques that involve the seed vertex 312. The graph 310 may be stored on storage device 104 and/or system memory 103.

In another example, the searching of the graph 310 in order to identify the cliques may automatically be performed, for example as soon as the graph 310 is stored on the computing system 100. The search of the graph 310 may, for example, be performed on a periodic basis as the graph 310 may regularly be updated or modified and the number of cliques may need to be updated.

A first PE of the set of PEs may receive an indication of the seed vertex 312 such that the searching process may start. The indication of the seed vertex 312 may for example be performed using a data structure that comprises an element referring to the seed vertex 312 e.g. an identifier of the seed vertex 312 that can be used in order to identify the seed vertex 312 in the graph 310. The first PE may be any available PE of the set of PEs. The first PE may be a user defined or selected PE or automatically selected PE of the set of PEs. The first PE may have access to the graph 310 e.g. on the storage device 104.

For example, as soon as the compute device 206A-N receives the request, the first PE may be selected and the first PE may be assigned the task of starting the search of the graph 310 using the seed vertex 312 as starting point.

The first PE may have access to set of vertices 313 (e.g. to a list indicating the set of vertices 313) of the graph 310 adjacent to the seed vertex 312. The set of vertices 313 comprises at least part of the adjacency list 314.1 of the seed vertex 312. For example, the set of vertices 313 may comprise at least part of the adjacent vertices of the seed vertex 312, and may thus be part of the adjacency list of the seed vertex 312. For example, the adjacency list 314.1 may comprise a data structure having elements associated with the vertices of the graph 310, wherein adjacent vertices 313 are each assigned value 1 and non-adjacent vertices are each assigned value 0. This is an implementation example; however, the adjacency list may be made out of others strings e.g. a list of the numbers referencing the adjacent vertices and the list is wrapped with a specific start and end tag or only with an end tag.

For example, in response to the selection of the first PE, the first PE may automatically receive set of vertices 313 (e.g. the list indicating the set of vertices 313). In another example, the first PE may receive an indication of seed vertex 312 and in response to receiving that indication the first PE may retrieve or read the set of vertices 313 from storage device 104. The storage device 104 may comprise adjacency lists 314.1-4 of vertices of the graph 310, wherein each adjacency list is associated with an indication of the corresponding vertex. The adjacency list 314.1 may comprise references of the set of vertices 313 within the graph 310. Such references may be used in order to locate or identify within the graph 310 each vertex of the set of vertices 313.

Having access to the set of vertices 313, the first PE may generate or create in step 301 a data structure 315A-C for each intermediate vertex 313A-C of the set of vertices 313. Each data structure 315A-C indicates the respective intermediate vertex 313A-C and an additional list of intermediate vertices of the set of vertices 313. As shown in FIG. 3, the data structure 315A-C may comprise a number of elements that correspond to vertices of the graph including the intermediate vertices 313A-C, wherein each element of at least part of the data structure 315A-C is assigned a respective intermediate vertex 313A-C. For example, the first non-null element 317A indicates the intermediate vertex 313A, while elements 317B-C indicate the additional list of intermediate vertices 313B-C. In another example, the first non-null element of the data structure 315B indicates the intermediate vertex 313B, while the second/last non non-null element indicates the additional list of intermediate vertices comprising the intermediate vertex 313C. Instead of a "non-null element" a "non-empty element" or the "next element in the list" may be used.

For example, the additional list L1 associated to the vertex 313A comprises a number N1 of all intermediate vertices of the set of vertices 313 that are different from vertex 313A. The additional list L2 associated to the vertex 313B may only contain a number of vertices N2=N1−1 that are selected from L1 and are different from vertex 313B, while the additional list L3 associated to the vertex 313C may only contain a number of vertices N3=N2−1 that are selected from L2 and are different from vertex 313C.

In the example shown in FIG. 3, the first non-null elements of the data structure 315A-C indicate the respective intermediate vertices 313A-C. For example, a given PE may read the data structure 315A and may search and identify the first non-null (or non-empty) element 317A in order to determine that the intermediate vertex 313A is assigned to that given PE. The structure of data elements as disclosed herein provides an example implementation; however, other tagging methods may be used to indicate a given vertex.

In another example, the generation of the data structures 315A-C may be performed by first generating the data structure 315A. The data structure 315A may be obtained by intersecting P 313 (or data structure 407.1) with the adjacency list of seed vertex 312 to obtain 315A. The data structure 315B may be obtained by zeroing the entry associated with the vertex 313A in the data structure 315A. The data structure 315C may be obtained by zeroing the entry associated with the vertex 313B in the data structure 315B.

Figure 4:
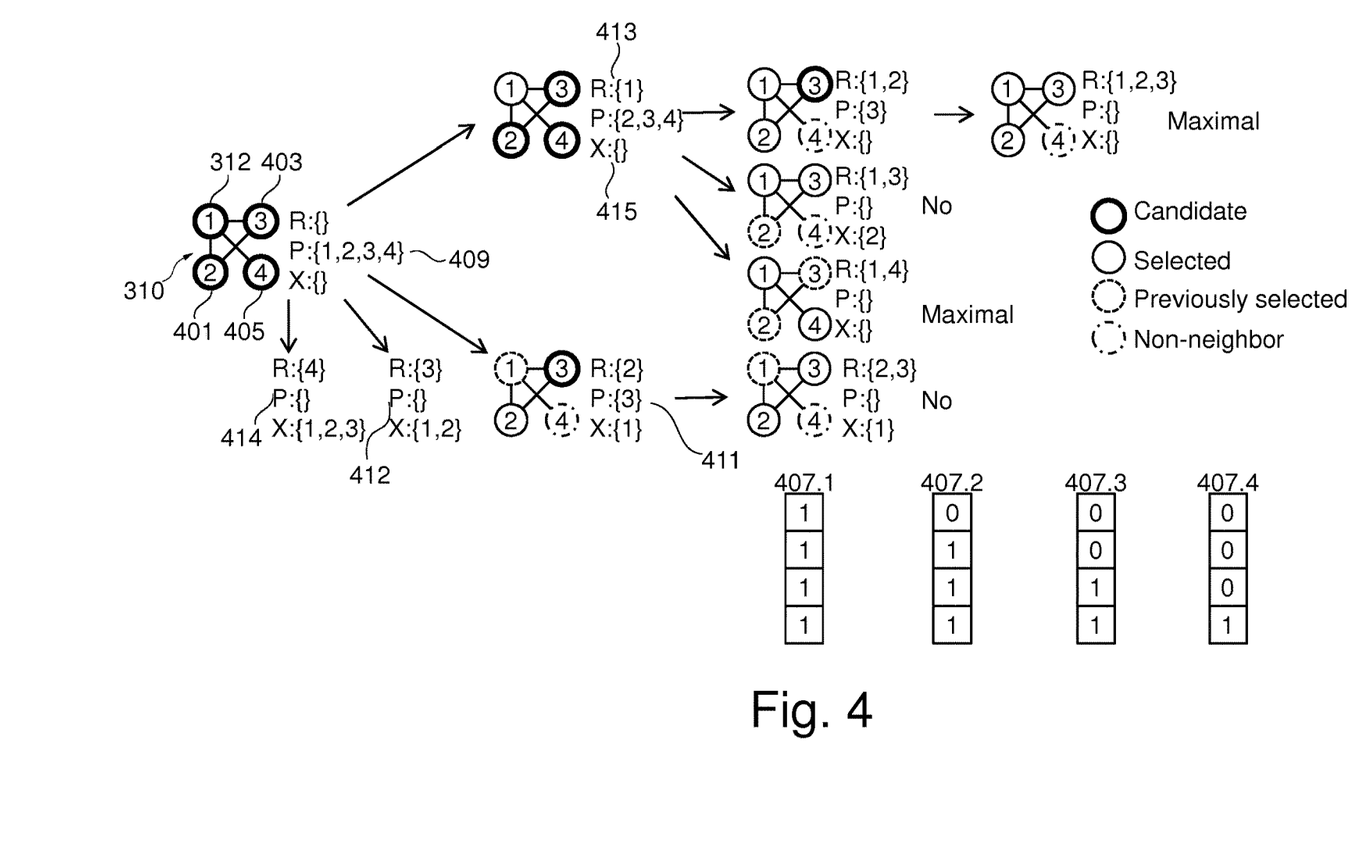
FIG. 4 illustrates a method for identifying cliques in the graph.

In step 303, the first PE may push or store the generated data structures 315A-C in a data buffer of the computer system 100. The data buffer, for example, comprise the GPU global cache memory 110 such that other PEs may be assigned or may have access to the data structures 315A-C. FIG. 4 depicts an example method for storing the data structures 315A-C in a FIFO buffer, although embodiments of the invention are not limited to any specific type of storage element. That is, other buffer/storage technologies may be used for storing the data structures 315A-C.

Following steps 305-311A (as illustrated by the dashed box of FIG. 3) may be performed for each buffered data structure 315A-C of the buffered data structures 315A-C. This may be performed in sequence or in parallel. For example, the data structure 315A may be first processed followed by the data structure 315B and then data structure 315C, in one or more embodiments. In another embodiment, the data structures 315A-C may be concurrently processed.

In step 305, an available PE of the set of PEs may receive a buffered data structure of the buffered data structures 315A-C from the data buffer. For example, the available PE may or may not be the first PE. The available PE may be configured or assigned the task of processing the intermediate vertex 313A-C that is indicated by the received data structure 315A-C. For example, the data buffer may be configured to send the buffered data structure to the available PE. Each available PE may signal its availability to the data buffer. For example, a PE as soon as being available may request the data buffer for inputs. In other words, the available PE signals that it is ready to receive new data from the data buffer and the data buffer may arbitrate from all the requests or signals (from available PEs) one and sends to it the next data within its memory.

For example, the available PE may receive data structure 315A. The available PE may read the data structure 315A and may search and identify the first non-null element 317A in order to determine that the intermediate vertex 313A is assigned to it.

Having access to the data structure 315A-C that is received in step 305, the available PE may wait for the adjacency list of the intermediate 313A-C vertex that is associated with the received data structure 315A-C. The available PE may be configured such that when receiving adjacency lists 314.1-4, the available PE may select the adjacency list that corresponds to the intermediate vertex that is assigned to it.

For example, if the available PE receives the data structure 315A (i.e. the available PE being assigned the intermediate vertex 313A) the available PE may wait for the adjacency list 314.2 of the vertex 313A. For example, if the available PE receives adjacency list 314.3 of intermediate vertex 313B, the available PE may ignore or reject or not process that adjacency list e.g. by doing nothing as it does not correspond to the intermediate vertex 313A and may wait for the adjacency list 314.1 that corresponds to its assigned intermediate vertex 313A.

Upon receiving in step 307 by the available PE the adjacency list 314.2 of the intermediate vertex 313A that is assigned to the available PE from the data buffer, the available PE may identify or select out of the set of vertices 313 in step 309 a set of further adjacent vertices 316A to the intermediate vertex 313A that is assigned to the available PE. The set of further vertices 316A may comprise intermediate vertices of the set of vertices 313 that are adjacent to the seed vertex 312 and that are part of the additional list L1 that is associated with the intermediate vertex 313A assigned to the available PE.

In case the available PE is assigned the intermediate vertex 313A, the available PE may read the corresponding adjacent list 314.2 and identify that the first element and the third element of the data adjacency list 314.2 are non-null elements. These non-null elements may correspond to or indicate adjacent vertices of the intermediate vertex 313A. In this example, the vertices 313B and 312 are adjacent to the intermediate vertex 313A. However, the available PE may exclude from the adjacency list the seed vertex 312 since it has been already processed i.e. the adjacency list of seed vertex 312 is already processed. This may be done, for example, using the data structure 315A.

By reading the data structure 315A, the available PE may determine that the first element of the data structure 315A that corresponds to the seed vertex 312 has a value zero. The value zero indicates that the seed vertex 312 is to be excluded from the adjacency list 314.2 by the available PE. However, values 1 of the third and fourth elements (i.e. that form additional list L1) of the data structure 315A indicates that the corresponding vertices 313B and 313C have to be maintained if they are part of the adjacency list 314.2. For example, the available PE may maintain the intermediate vertex 313B as an adjacent vertex to the intermediate vertex 313A since the third element of the data structure 315A has value 1. In other words an intersection of the data structure 315A and 314.2 (315A∩314.2) may be performed in order to obtain the set of further vertices 316A of the intermediate vertex 313A.

In case the available PE is assigned the intermediate vertex 313B, the available PE may read the corresponding adjacent list 314.3 and identify that the first element and the second element of the data adjacency list 314.3 are non-null elements. These non-null elements may correspond to adjacent vertices of the intermediate vertex 313B. In this example, the vertices 313A and 312 are adjacent to the intermediate vertex 313B. However, the available PE may exclude from the adjacency list the seed vertex 312 since it has been already processed i.e. the adjacency list of seed vertex 312 is already processed. This may be done for example using the data structure 315B.

By reading the data structure 315B, the available PE may determine that the first element and second element of the data structure 315B that corresponds to the vertices 312 and 313A respectively have value zero. The value zero indicates that the seed vertex and the intermediate vertex 313A is to be excluded from the adjacency list 314.3 by the available PE. In other words an intersection of the data structure 315B and 314.3 (315B∩314.3) may be performed in order to obtain the adjacent vertices of the intermediate vertex 313B. In this case, no adjacent vertices are found anymore. Thus, the two vertices 312 and 313B that have been processed along the processing path 351 form a clique candidate 319B.

In case (inquiry 310) the set of further vertices 316A-C comprises at least one further vertex that is selected or identified in step 309, steps 301-309 may be repeated with the available PE being the first PE and the set of further vertices 316A being the set of vertices 313. Otherwise, a clique candidate may be generated in step 311A using the seed vertex and the intermediate vertices that have been processed along processing paths 350-352. For example, in case of intermediate vertices 313B-C, the resulting set of further vertices comprise no vertices and thus, clique candidates 319B and 319C may be identified or built, wherein the clique candidate 319B comprises the seed vertex 312 and the intermediate vertex 313B and the clique candidate 319C comprises the seed vertex 312 and the intermediate vertex 313C that has been processed along the processing path 352.

The repeating of steps 301-309 may be performed until no further adjacent vertex of each processed vertex is found. In the example shown in FIG. 3, the repeating of steps 301-309 with the available PE being the first PE and the set of further vertices 316A being the set of vertices 313 results in a set of further vertices 316D that has no vertices. Thus, the clique candidate 319A may be identified or built using the seed vertex 311B and the intermediate vertices that have been successively processed 313A and 313B along the processing path 350.

In step 311B, cliques may be identified or selected among the clique candidates 319A-C such that those cliques have non-overlapping pairs of vertices and comprising a maximum number of vertices. For example, clique candidates 319B and 319A overlap in that they have the same pair of vertices (312, 313B). However, since the clique candidate 319A has the maximum number of vertices 3, the clique candidate 319B may not be selected and the clique candidate 319A may be selected as a clique. The clique candidate 319C may be selected as it has no overlapping pairs with the other clique candidates. Thus 319A and 319C may be the resulting cliques.

FIG. 4 illustrates a method for identifying cliques in the whole graph 310. For that, the method of FIG. 3, namely steps 301-311B, may be repeated starting from different seed vertices. For example, the method of FIG. 3 may be performed by taking each of the vertices 312, 401, 403 and 405 as a seed vertex.

In a step S1, a data structure may be generated for each vertex of the graph 310. The method for generating the data structure may be the same method as described with reference to FIG. 3, step 301. For example, a data structure that is generated for vertex 312 may indicate the vertex 312 and an additional list LL1 of all vertices of the graph 310 that are adjacent to vertex 312 such that they can be processed together with the vertex 312. The data structure for vertex 401 may indicate the vertex 401 and an additional list LL2 of vertices of LL1 wherein LL2 comprises M1 vertices while LL2 comprises M2=M1−1 vertices of LL1 and so on with the other vertices 403-405. This may result in data structures 407.1-4. For example, data structure 407.1 may be first generated by intersecting set P 409 with the total number of vertices since no vertex has been processed yet. The other data structures 407.2-407.4 may be sequentially obtained as explained above e.g. by reducing one non-null element in each subsequent data structure. This (reducing by one element) method is provided as an example; however, other methods may be used. By using such data structures 407.1-4, the identification of the same cliques more than once may be avoided.

Each first PE may be assigned a respective vertex 312, 401, 403 or 405. Each first PE may have access to respective set of vertices 313, 411, 412 and 414. The set of vertices 313, 411, 412 and 414 may be obtained as explained above with respect to the set of vertices 316A-C. For example, the first PE that is assigned and receives data structure 407.1 may perform an intersection of 407.1 with the adjacency list 314.1 of the vertex 312 in order obtain a list of vertices of the set of vertices 313.

Steps 303-311B may be repeated using the generated data structures of step S1. For example, for vertex 405 it may be determined as in step 309 the intersection of data structure 407.4 and adjacency list 314.4 (407.4∩314.4) which may then result in zero vertices and thus no cliques may be induced by the seed vertex 405.

FIG. 4 (and FIG. 3) shows how an example implementation of Bron-Kerbosch (BK) algorithm works at least on a portion of a small graph of four vertices 310. The set P 409 contains all vertices from the graph 310. The set Pj for every subsequence step of the algorithm may be restricted to the neighbor set N(v) of the previous vertex v as follows [P∩N(v)].

A constant stream of the all the adjacency lists may be created. The PEs have locally stored a set Pi (e.g. 407.1-4) which represents the state of the processing step indirectly. The first vertex Vx (e.g. the first element having value 1) in Pi indicates to the according PE to wait for the related adjacency list to appear in its input. The PE then computes with this list N(Vx) the restricted subset Pi+1=Pi ∩ N(Vx) on-the-fly. This new set Pi+1 is then pushed into the data buffer. However, this subset Pi+1 is replicated by the number of entries in it, but every replication consists of one entry less. This ensures that a vertex is not revisited again. As described above, the data structure 315A (e.g. Pi+1) may be obtained by intersecting data structure 407.1 (e.g. Pi) with adjacency list of vertex 312 (N(vx)).

Idle PEs may be fed by the data buffer with pending workloads until no PE produces any new set of Pi+1. The P-set represents the state of individual processing steps. By order of its elements and the appearance of its elements, the state may be completely defined in perspective of the processing step. For the algorithm itself also a token consisting of the tuple (R, X) may be computed and stored together with the P. X 415 indicates whether the end of a search was successful or not. In case it is not empty, the finding is not maximum. R 413 is the result that should be presented at the end to the host, and belongs to the individual P.

The PEs are initialized all already at the first step of the tree-search. The initial set P0 e.g. 407.1 is presented to all the PEs with every copy reduced by an element (reducing an element may comprise assigning a value 0 in the data structure to that reduced element). Thus, at the last PE on receives a set Pn−1 (407.4) consisting of a single element. Therefore, already at the first step the full parallelism of the architecture can be exploited.

Figure 5:
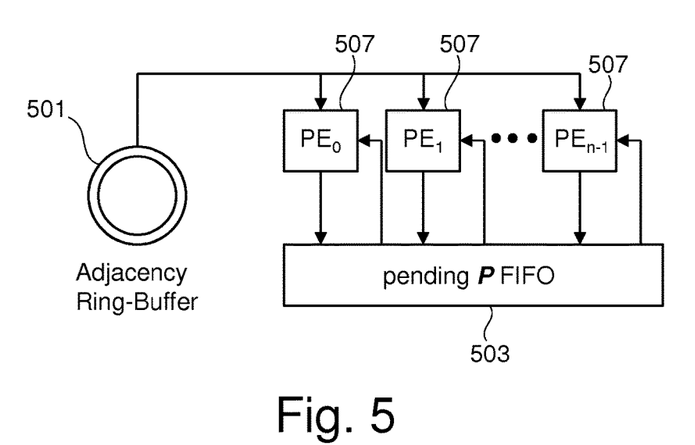
FIG. 5 illustrates a simplified structure of a first-in first-out (FIFO) system.

FIG. 5 illustrates a simplified structure of a FIFO system 500 for performing at least part of the present method, according to an embodiment of the invention. The FIFO system 500 comprises a ring buffer 501 and a FIFO buffer 503 that is connected to the set of PEs 507. The ring buffer 501 may store the adjacency lists 314.1-4 of the vertices of the graph 310. The ring buffer 501 may be configured to stream the adjacency lists 314.1-4 to the set of PEs 507. The streamed adjacency lists are received in a stream by each of the set of PEs 507 (e.g. in step 307) and processed as described with reference to FIG. 3.

For example, the generated data structures of step 301 may be stored and received from the FIFO buffer 503 according to a FIFO mode of operation. For example, data structures 315A-C and/or 407.1-4 may be stored on the FIFO buffer 503, and the stored data structures may be sent consecutively following their storage order to a respective PE 507 of the set of PEs that is available e.g. in idle mode.

The FIFO buffer 503 may consist of several parallel internal FIFOs. At the input of the FIFO buffer 503 a small network makes sure that as many results from the PEs can be stored at once as possible. In case there is no internal FIFO free, the according write request from the PE may be blocked. At the output of the FIFO buffer 503 there is a small arbiter which empties the internal FIFOs by providing data to the idle PEs.

Figure 6:
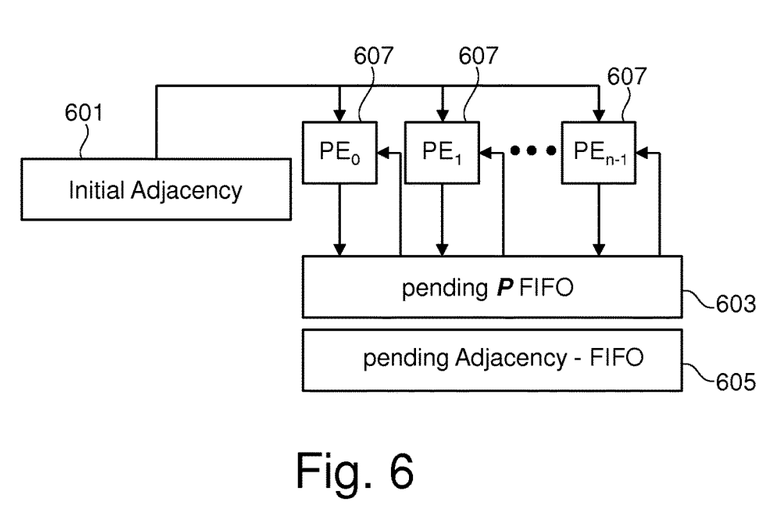
FIG. 6 illustrates a simplified structure of another FIFO system.

FIG. 6 illustrates a simplified structure of another FIFO system 600 for performing at least part of the present method, according to an embodiment of the invention. FIFO system 600 comprises a buffer 601 and parallel FIFO buffers 603 and 605 that are connected to the set of PEs 607. FIFO buffer 603 may store generated data structures 315A-C and/or 407.1-4. FIFO buffers may store the determined set of vertices 313, 316A-C. In this manner, the streaming of the adjacency lists may not be needed as the FIFO buffer 603 may send or assign the adjacency list to the available PE, such that the available PE receives from the FIFO buffer 603 a given data structure that is associated with the vertex assigned to the available PE and receives from FIFO buffers 605 the adjacency list that is stored together with that given data structure.

This may provide an optimization of the architecture of FIG. 5. Instead of presenting the entire adjacency list at the input of the PEs constantly during the entire algorithm processing, the entire list is only presented in the first step. After this step a new adjacency list is compiled by the PEs, which consists only of the N(v) for every v actually represented in the set Pi+1. N is stored in parallel to the according P and is fed together into idle PEs for further processing.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for searching a graph to identify cliques using a set of processing elements (PEs), wherein a first PE of the set of PEs has access to a set of vertices adjacent to a seed vertex of the graph, the method comprising:
   a) generating, by the first PE, a data structure for each intermediate vertex of the set of vertices, the data structure indicating the respective intermediate vertex and an additional list of zero or more intermediate vertices of the set of vertices;
   b) storing, by the first PE, the generated data structures on a data buffer;
   c) for each buffered data structure of the buffered data structures:
      receiving, by an available PE of the set of PEs, the buffered data structure from the data buffer;
      configuring the available PE to receive an adjacency list of the intermediate vertex indicated in the respective data structure and to select from the adjacency list of the intermediate vertex a set of further vertices that are adjacent to the seed vertex and are part of the additional list;
      when at least one further vertex is selected, repeating steps a) through c) with the available PE being the first PE and the set of further vertices being the set of vertices; and
      when no further vertex is selected, generating a clique candidate using the seed vertex and the intermediate vertices that have been processed in step c); and
   d) selecting, among the clique candidates having overlapping pairs of vertices, cliques comprising a maximum number of vertices and selecting other cliques as clique candidates having non-overlapping pairs of vertices with other clique candidates;
   wherein receipt of the adjacency list of the intermediate vertex indicated in the respective data structure comprises receiving a stream of adjacency lists of vertices of the graph and identifying the adjacency list of the intermediate vertex using the data structure.

2. The method of claim 1, wherein receipt of the adjacency list of the intermediate vertex indicated in the respective data structure comprises:
   providing a ring buffer; and
   receiving from the ring buffer the stream of adjacency lists of vertices of the graph.

3. The method of claim 1, further comprising storing, by the first PE, the set of vertices in association with the generated data structures, wherein the available PE is further configured to receive the set of vertices from the data buffer, and wherein the adjacency list of the intermediate vertex indicated in the respective data structure comprises at least part of the set of vertices.

4. The method of claim 3, wherein the available PE is configured to receive the set of vertices together with the buffered data structure from the data buffer.

5. The method of claim 1, wherein the data buffer comprises a first-in first-out (FIFO) buffer, and wherein data structures are stored and received from the FIFO buffer according to a FIFO mode of operation.

6. The method of claim 1, wherein step c) is sequentially performed for each buffered data structure.

7. The method of claim 1, wherein the available PE is an idle PE.

8. The method of claim 1, wherein steps a) through c) are performed in accordance with a Bron-Kerbosch algorithm.

9. The method of claim 1, further comprising repeating steps a) through c) for each vertex of the graph using a respective first PE, with the each vertex being the seed vertex.

10. The method of claim 9, wherein the graph comprises N vertices, where N is an integer, the method further comprising assigning to the each vertex a different value i that is between 1 and N, wherein the set of vertices to which the first PE has access comprises N−i vertices of the N vertices that are adjacent to the seed vertex.

11. The method of claim 1, wherein generating, by the first PE, the data structure for each intermediate vertex of the set of vertices comprises generating the data structure having a number of elements associated with each intermediate vertex of the set of vertices, and tagging the element associated with the given intermediate vertex differently from the other elements, wherein the available PE is further configured to use the tagging to identify the given intermediate vertex.

12. The method of claim 11, wherein tagging comprises assigning the first element of the data structure to the given intermediate vertex.

13. The method of claim 11, wherein tagging comprises assigning the first non-null element of the data structure to the given intermediate vertex.

14. The method of claim 1, wherein the graph comprises an undirected graph.

15. The method of claim 1, wherein the graph comprises at least one of an undirected graph with web pages as vertices and links as edges, and a graph representing a social network connecting multiple users, wherein users are represented by nodes and user dependencies are represented by edges.

16. The method of claim 1, wherein the set of vertices comprises a number N of vertices, where N is an integer, the zero or more intermediate vertices comprise N−i intermediate vertices of the set of vertices, wherein i is between 1 and N, wherein each intermediate vertex of the set of vertices is assigned a different value of i.

17. A set of processing elements (PEs) for searching a graph to identify cliques, the set of PEs comprising a first PE having access to a set of vertices adjacent to a seed vertex of the graph, the first PE being configured:
   a) to generate a data structure for each intermediate vertex of the set of vertices, the data structure indicating the respective intermediate vertex and an additional list of zero or more intermediate vertices of the set of vertices;
   b) to store the generated data structures in a data buffer;
   c) for each buffered data structure of the buffered data structures, the set of PEs comprising an available PE being configured:
      to receive, by an available PE of the set of PEs, the buffered data structure from the data buffer; and
      to configure the available PE to receive an adjacency list of the intermediate vertex indicated in the respective data structure and to select from the adjacency list of the intermediate vertex a set of further vertices that are adjacent to the seed vertex and are part of the additional list, wherein receipt of the adjacency list of the intermediate vertex indicated in the respective data structure comprises receiving a stream of adjacency lists of vertices of the graph and identifying the adjacency list of the intermediate vertex using the data structure;
   wherein in case at least one further vertex is selected, repeating steps a) through c) with the available PE being the first PE and the set of further vertices being the set of vertices.

18. A hardware accelerator comprising a set of processing elements (PEs) according to claim 17, the hardware accelerator being configured for selecting among clique candidates having overlapping pairs of vertices cliques comprising a maximum number of vertices and for selecting other cliques as clique candidates having non-overlapping pairs of vertices with other clique candidates.

* * * * *